US011096108B2

(12) United States Patent
Subbiah et al.

(10) Patent No.: US 11,096,108 B2
(45) Date of Patent: Aug. 17, 2021

(54) ASYMMETRIC LOGICAL UNIT ACCESS PATH SELECTION SYSTEM

(71) Applicant: Dell Products L.P., Round Rock, TX (US)

(72) Inventors: Ramesh Kumar Subbiah, Chennai (IN); Vibin Varghese, Tamil Nadu (IN)

(73) Assignee: Dell Products L.P., Round Rock, TX (US)

( * ) Notice: Subject to any disclaimer, the term of this patent is extended or adjusted under 35 U.S.C. 154(b) by 162 days.

(21) Appl. No.: 16/667,490

(22) Filed: Oct. 29, 2019

(65) Prior Publication Data

US 2021/0127315 A1 Apr. 29, 2021

(51) Int. Cl.
*H04W 40/02* (2009.01)
*H04W 88/18* (2009.01)
*H04L 12/733* (2013.01)
*G06F 13/40* (2006.01)
*H04L 12/933* (2013.01)
*G06F 13/16* (2006.01)

(52) U.S. Cl.
CPC ........ *H04W 40/02* (2013.01); *G06F 13/1668* (2013.01); *G06F 13/4022* (2013.01); *H04L 45/122* (2013.01); *H04L 45/20* (2013.01); *H04L 49/10* (2013.01); *H04W 88/182* (2013.01)

(58) Field of Classification Search
None
See application file for complete search history.

(56) References Cited

U.S. PATENT DOCUMENTS

| 2016/0066249 | A1* | 3/2016 | Dukes | H04W 40/248 |
| | | | | 370/255 |
| 2017/0070419 | A1* | 3/2017 | Singhal | H04L 45/64 |
| 2017/0277439 | A1* | 9/2017 | Kalman | G06F 3/061 |
| 2018/0219790 | A1* | 8/2018 | Azgin | H04L 45/20 |
| 2019/0310925 | A1* | 10/2019 | Yoshida | G06F 3/0614 |

* cited by examiner

*Primary Examiner* — Rebecca E Song
(74) *Attorney, Agent, or Firm* — Haynes and Boone, LLP

(57) ABSTRACT

An ALUA path selection system includes a networking device in a networking fabric that couples a host device to a storage subsystem. The networking device receives a host device communication generated by the host device and retrieves a host device hop count that identifies a number of hops between the host device and the networking device. The networking device also receives a storage subsystem communication generated by the storage subsystem and retrieves a storage subsystem hop count that identifies a number of hops between the storage subsystem and the networking device. When the networking device receives a hop count request from the host device, it transmits the host device hop count and/or the storage subsystem hop count to the host device, and the host device uses the host device hop count and/or the storage subsystem hop count to select an active-optimized path to a LUN included in the storage subsystem.

20 Claims, 12 Drawing Sheets

ASYMMETRIC LOGICAL UNIT ACCESS PATH SELECTION SYSTEM

BACKGROUND

The present disclosure relates generally to information handling systems, and more particularly to selecting paths available via information handling systems in an Asymmetric Logical Unit Access (ALUA) configuration.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may sometimes utilize an Asymmetrical Logical Unit Access (ALUA) configuration to provide an ALUA system. For example, an ALUA system may include host devices that are coupled via networking devices to storage subsystems that each include multiple storage controllers, with each storage controller mapped to particular logical units in its storage device that are identified by respective Logical Unit Numbers (LUNs). As will be appreciated by one of skill in the art in possession of the present disclosure, such ALUA systems allows each host device to identify any particular LUN via the storage controllers in a storage subsystem as "active", but with only one of those storage controllers "owning" that LUN. This results in a "active-optimized" path via one of the networking devices to any particular LUN, with that active-optimized path providing a direct path to the storage controller that owns that LUN, and an "active non-optimized path" via one of the networking devices to that LUN, with that active-non-optimized path providing a path to a storage controller that does not own that LUN, but that has an indirect path to the storage controller that does own that LUN via an interconnect bus between those storage controllers.

However, conventional techniques for selecting active-optimized paths between host devices and respective LUNs included in storage subsystems do not take into account the number of "hops" between the host device and the storage subsystem. As such, when devices such as, for example, N_Port Identifier Virtualization (NPIV) Proxy Gateway (NPG) devices are utilized in such ALUA systems, active-optimized paths between host devices and storage subsystems may be selected that require more hops between the host device and the storage subsystem than would be utilized in the active-non-optimized path. As such, an active-optimized path between a host device and a storage subsystem may be selected and utilized in an ALUA system that results in inefficient data exchanges, as the alternate active-non-optimized path between the host device and the storage subsystem may require fewer hops.

Accordingly, it would be desirable to provide an ALUA path selection system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a path selection engine that is configured to: receive a host device communication generated by a host device; retrieve, from the host device communication, a host device hop count that identifies a number of hops between the host device and the processing system; receive a storage subsystem communication generated by a storage subsystem; retrieve, from the storage subsystem communication, a storage subsystem hop count that identifies a number of hops between the storage subsystem and the processing system; receive, from the host device, a hop count request; and transmit, in response to the hop count request, at least one of the host device hop count and the storage subsystem hop count, wherein the at least one of the host device hop count and the storage subsystem hop count are configured for use by the host device to select an active-optimized path to a Logical Unit Number (LUN) included in the storage subsystem.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
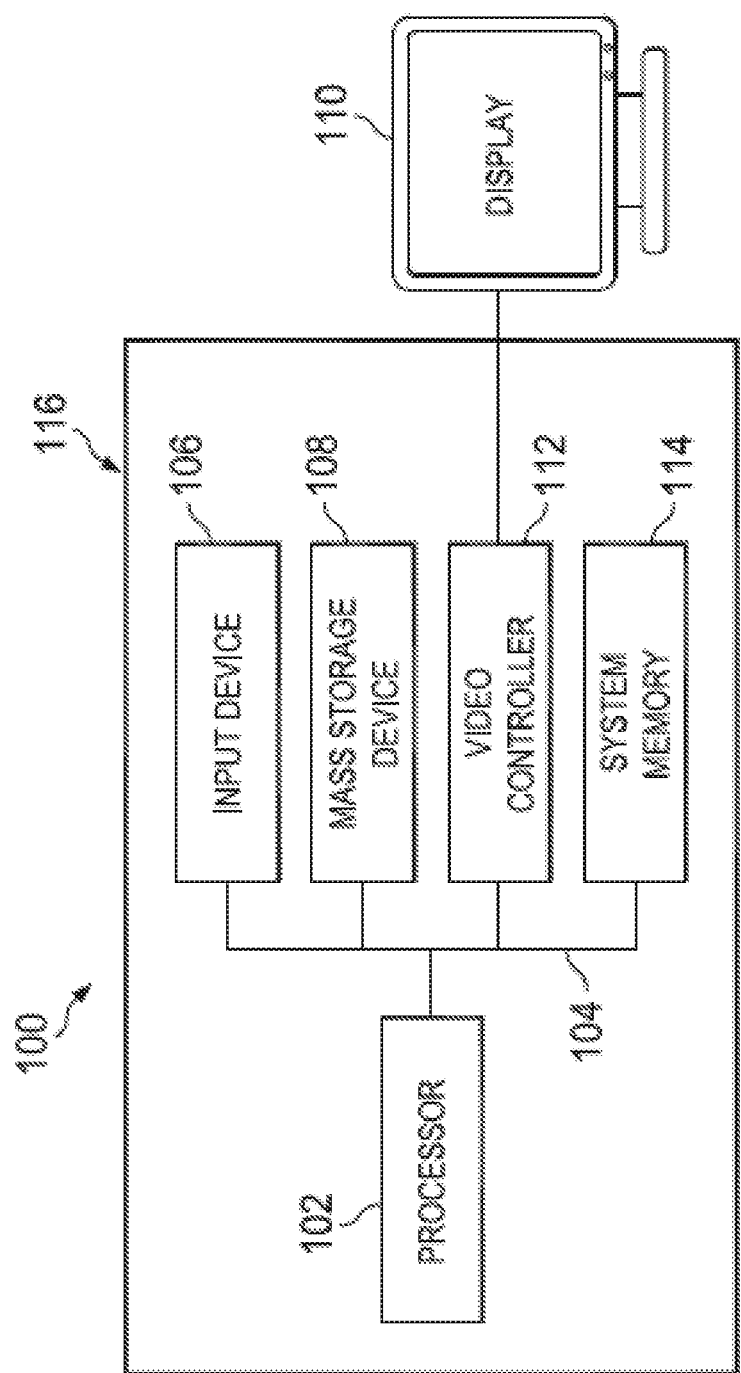
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
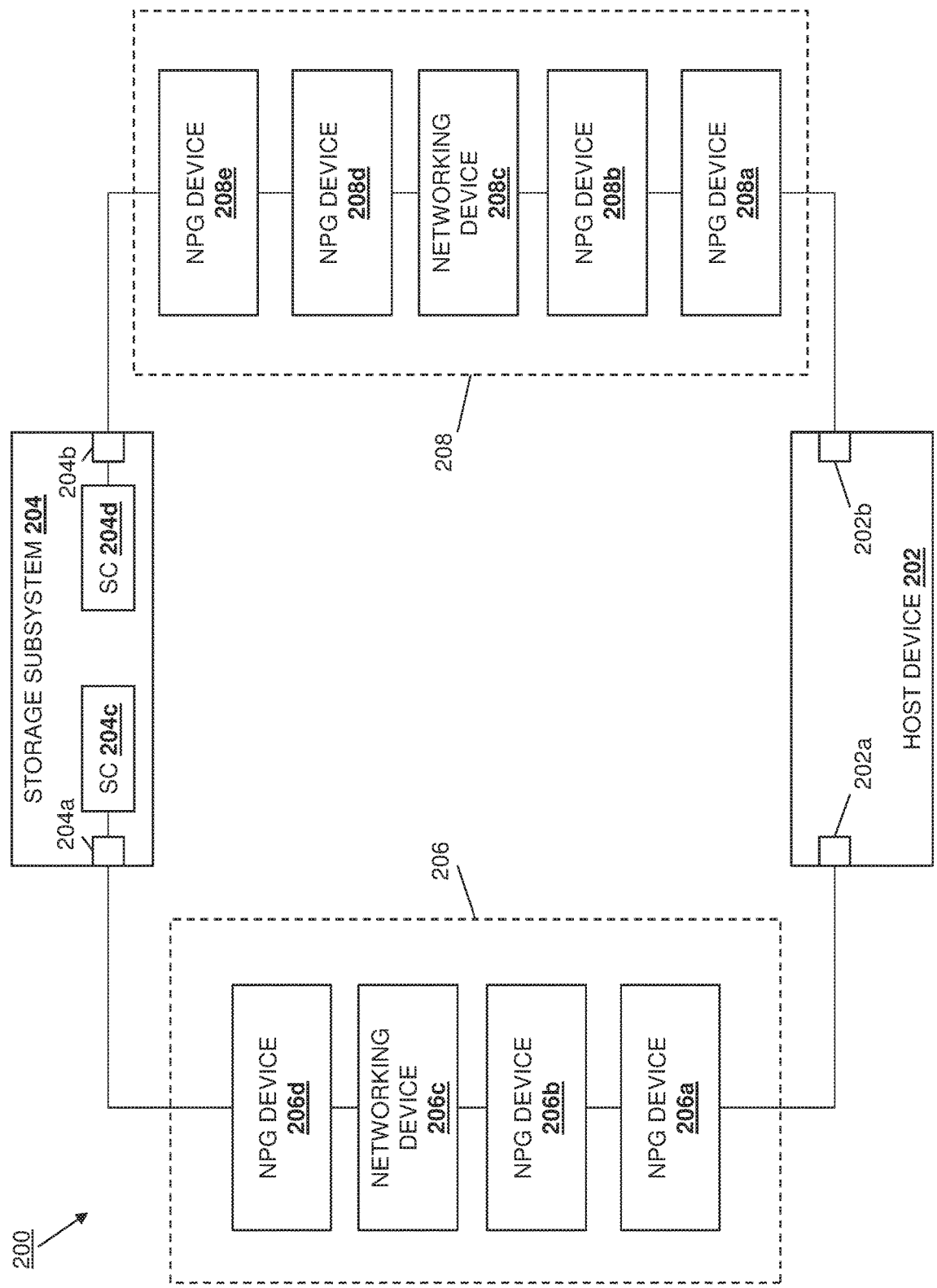
FIG. 2 is a schematic view illustrating an embodiment of an ALUA path selection system.

Referring now to FIG. 2, an embodiment of an Asymmetric Logical Unit Access (ALUA) path selection system 200 is illustrated. As would be appreciated by one of skill in the art in possession of the present disclosure, ALUA (sometimes also referred to as Target Port Groups Support (TPGS)) may be utilized to define path prioritization between host devices and storage subsystems by formally describing storage subsystem port status and access characteristics in a manner that defines how multipath Input/Output (10) should be managed between the host device and the storage subsystems. However, while illustrated and described as an ALUA system, one of skill in the art in possession of the present disclosure will recognize that the concepts described herein may be applied to other types of systems while remaining within the scope of the present disclosure as well. In the illustrated embodiment, the ALUA path selection system 200 incudes a host device 202. In an embodiment, the host device 202 may be provided by the IHS 100 discussed above with reference to FIG. 1, and/or may include some or all of the components of the IHS 100, and in specific examples below is described as being provided by a server device. However, while illustrated and discussed as being provided by a server device, one of skill in the art in possession of the present disclosure will recognize that the host device 202 provided in the ALUA path selection system 200 may include any device that may be configured to operate similarly as the host device discussed below. As illustrated, the host device 202 may include a plurality of ports. For example, the host device 202 may include an adapter (e.g., a Host Bus Adapter (HBA), a Converged Network Adapter (CNA), and/or other adapters that would be apparent to one of skill in the art in possession of the present disclosure) having a pair of ports 202*a* and 202*b*. However, while a particular host device 202 is described and illustrated, one of skill in the art in possession of the present disclosure will appreciate that different numbers of host devices with different components and/or component configurations will fall within the scope of the present disclosure as well.

In the illustrated embodiment, the ALUA path selection system 200 also includes a storage subsystem 204. In an embodiment, the storage subsystem 204 may be provided by the IHS 100 discussed above with reference to FIG. 1, and/or may include some or all of the components of the IHS 100, and in specific examples below is described as being provided by one or more storage device(s) (e.g., Hard Disk Drives (HDDs), Solid State Drives (SSDs), etc.). However, while illustrated and discussed as being provided by storage device(s), one of skill in the art in possession of the present disclosure will recognize that the storage subsystems 204 provided in the ALUA path selection system 200 may include any devices that may be configured to operate similarly as the storage subsystem 204 discussed below. As illustrated, the storage subsystem 204 may include a plurality of ports 204*a* and 204*b*, with each port 204*a* and 204*b* coupled to a respective storage controller 204*c* and 204*d*. As will be appreciated by one of skill in the art in possession of the present disclosure, the storage subsystem 204 may include storage elements (not illustrated) that may be utilized to provide logical units that are configured to store data and that are identified by Logical Unit Numbers (LUNs). However, while a particular storage subsystem 204 is described and illustrated, one of skill in the art in possession of the present disclosure will appreciate that different numbers of storage subsystems with different components and/or component configurations will fall within the scope of the present disclosure as well.

In the illustrated embodiment, the ALUA path selection system 200 includes a pair of networking fabrics 206 and 208, each of which couple the host device 202 to the storage subsystem 204. For example, the networking fabric 206 includes an Node Port (N_Port) Identifier Virtualization (NPR') Proxy Gateway (NPG) device 206*a* that is coupled to the port 202*a* on the host device 202, an NPG device 206*b* that is coupled to the NPG device 206*a*, a networking device 206*c* that is coupled to the NPG device 206*b*, and an NPG device 206*d* that is coupled to the networking device 206*c* and to the port 204*a* on the storage subsystem 204. Similarly, the networking fabric 208 includes a NPG device 208*a* that is coupled to the port 202*b* on the host device 202, an NPG device 208b that is coupled to the NPG device 208a, a networking device 208c that is coupled to the NPG device 208b, an NPG device 208d that is coupled to the networking device 208c, and an NPG device 208e that is coupled to the NPG device 208d and to the port 204b on the storage subsystem 204. As will be appreciated by one of skill in the art in possession of the present disclosure, the fabrics 206 and 208 may be considered as "air-gapped" fabrics, as they are separate except for each being coupled to the host device 202 and the storage subsystem 204.

In an embodiment, any or all of the NPG devices 206a, 206b, 206d, 208a, 208b, 208d, and 208d may be provided by the IHS 100 discussed above with reference to FIG. 1, and/or may include some or all of the components of the IHS 100, and in examples below may be provided by Fiber Channel Forwarder (FCF) switch devices that operate in an NPG mode. However, while illustrated and discussed as being provided by FCF switch devices operating in an NPG mode, one of skill in the art in possession of the present disclosure will recognize that NPG devices 206a, 206b, 206d, 208a, 208b, 208d, and 208d provided in the ALUA path selection system 200 may include any devices that may be configured to operate similarly as the NPG devices 206a, 206b, 206d, 208a, 208b, 208d, and 208d discussed below. For example, in some embodiments, the NPG devices of the present disclosure may be replaced by Fibre Channel over Ethernet (FCoE) Initialization Protocol (RP) snooping bridge devices in an FCoE system (i.e., rather than the FC system described herein.)

Similarly, either or both of the networking devices 206c and 208c may be provided by the IHS 100 discussed above with reference to FIG. 1, and/or may include some or all of the components of the IHS 100, and in examples below are described as being provided by Fiber Channel (FC) switch devices that includes Fabric port(s) (F_port(s)) coupled to their connected NPG devices. However, while illustrated and discussed as being provided by FC switch devices, one of skill in the art in possession of the present disclosure will recognize that networking devices 206c and 208c provided in the ALUA path selection system 200 may include any devices that may be configured to operate similarly as the networking devices 206c and 208c discussed below. Furthermore, while a specific ALUA path selection system 200 has been illustrated and described, one of skill in the art in possession of the present disclosure will recognize that the ALUA path selection system of the present disclosure may include a variety of components and component configurations while remaining within the scope of the present disclosure as well.

Figure 3:
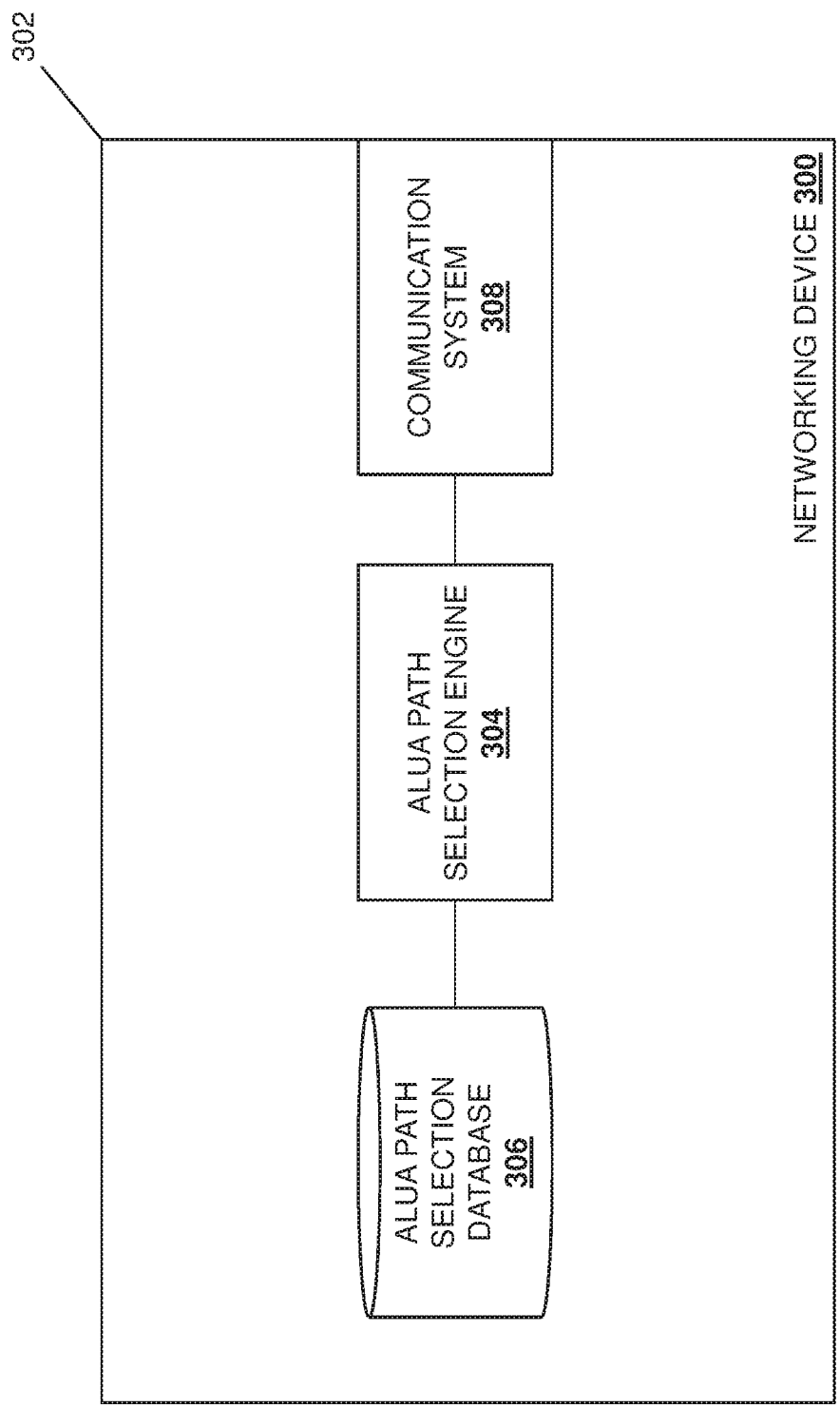
FIG. 3 is a schematic view illustrating an embodiment of a networking device that may be provided in the ALUA path selection system of FIG. 2.

Referring now to FIG. 3, an embodiment of a networking device 300 is illustrated that may provide either or both of the networking devices 206c and 208c discussed above with reference to FIG. 2. As such, the networking device 300 may be provided by the IHS 100 discussed above with reference to FIG. 1 and/or may include some or all of the components of the IHS 100, and in specific examples may be provided by an FC switch device. However, while illustrated and discussed as an FC switch device, one of skill in the art in possession of the present disclosure will recognize that the functionality of the networking device 300 discussed below may be provided by other devices that are configured to operate similarly as networking device 300 discussed below. In the illustrated embodiment, the networking device 300 includes a chassis 302 that houses the components of the networking device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an ALUA path selection engine 304 that is configured to perform the functionality of the ALUA path selection engines and/or networking devices discussed below.

The chassis 302 may also house a storage system (not illustrated, but which may include the storage 108 discussed above with reference to FIG. 1) that is coupled to the ALUA path selection engine 304 (e.g., via a coupling between the storage system and the processing system) and that includes an ALUA path selection database 306 that is configured to store any of the information utilized by the ALUA path selection engine 304 discussed below. The chassis 302 may also house a communication system 308 that is coupled to the ALUA path selection engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. While a specific networking device 300 has been illustrated, one of skill in the art in possession of the present disclosure will recognize that networking devices (or other devices operating according to the teachings of the present disclosure in a manner similar to that described below for the networking device 300) may include a variety of components and/or component configurations for providing conventional networking device functionality, as well as the functionality discussed below, while remaining within the scope of the present disclosure as well.

Figure 4:
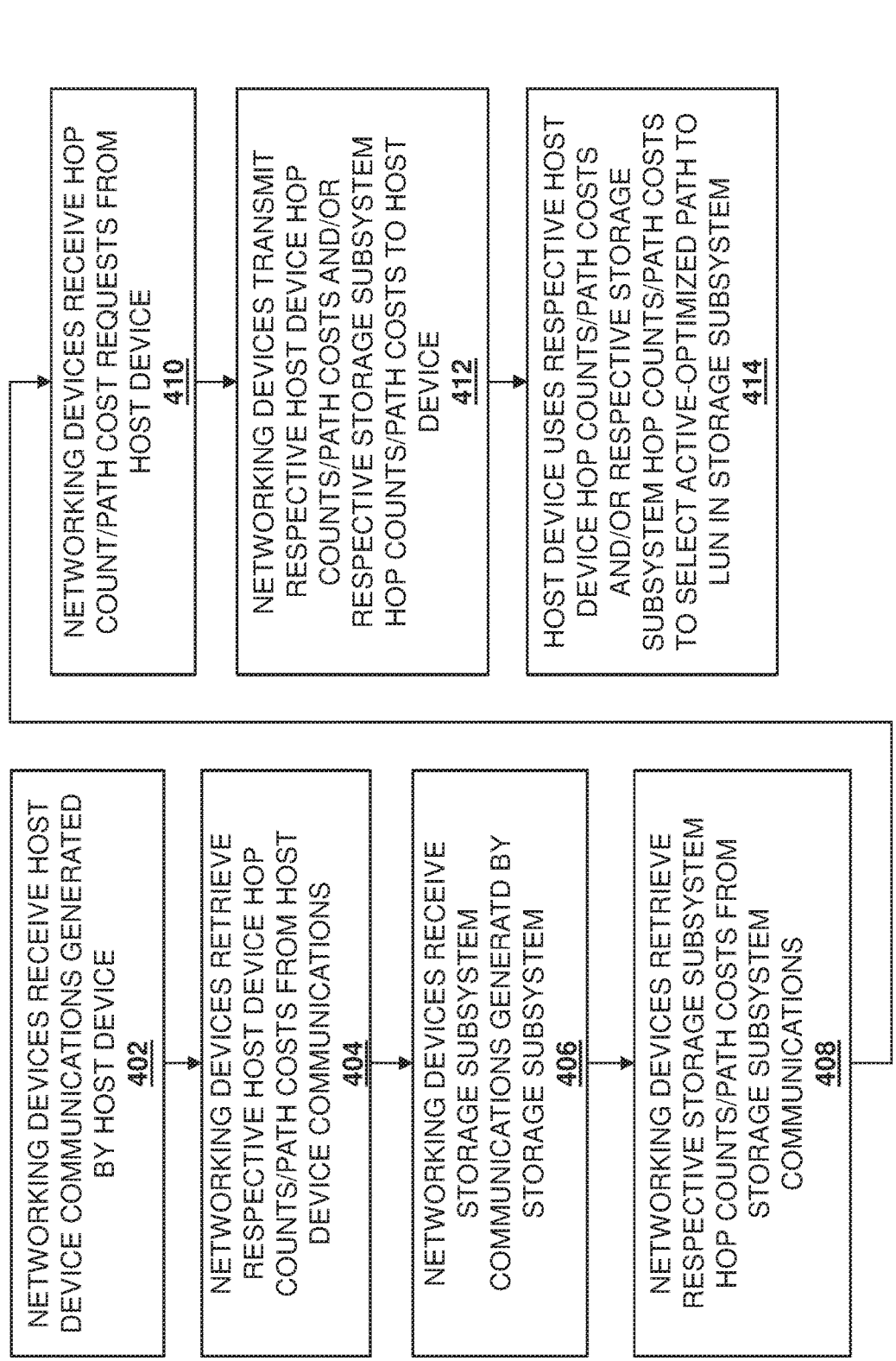
FIG. 4 is a flow chart illustrating an embodiment of a method for selecting paths in an ALUA system.

Referring now to FIG. 4, an embodiment of a method 400 for selecting paths in an ALUA system is illustrated. As discussed below, the systems and methods of the present disclosure provide for the identification of hop counts/path costs between end devices via different paths that include different networking devices, and the provisioning of those hop counts/path costs to host devices for use in selecting an active-optimized path in an ALUA system with the lowest hop count/path cost. For example, different networking devices may receive host device communications generated by a host device, and may each retrieve a host device hop count from those host device communications that identifies the number of hops between the host device and that networking device. Those networking devices may also receive storage subsystem communications generated by a storage subsystem, and may each retrieve storage subsystem hop counts from those storage subsystem communications that identify a number of hops between the storage subsystem and that networking device. When the networking devices receive hop count/path cost requests from the host device, they may each transmit at least one of their retrieved host device hop count and storage subsystem hop count to the host device, and the host device may use the host device hop counts and/or the storage subsystem hop counts received from the different networking devices to select an active-optimized path to a Logical Unit Number (LUN) included in the storage subsystem that has the fewest number of hops. As such, more efficient active-optimized paths between host devices and storage subsystems may be selected and utilized in ALUA systems.

Figure 5A:
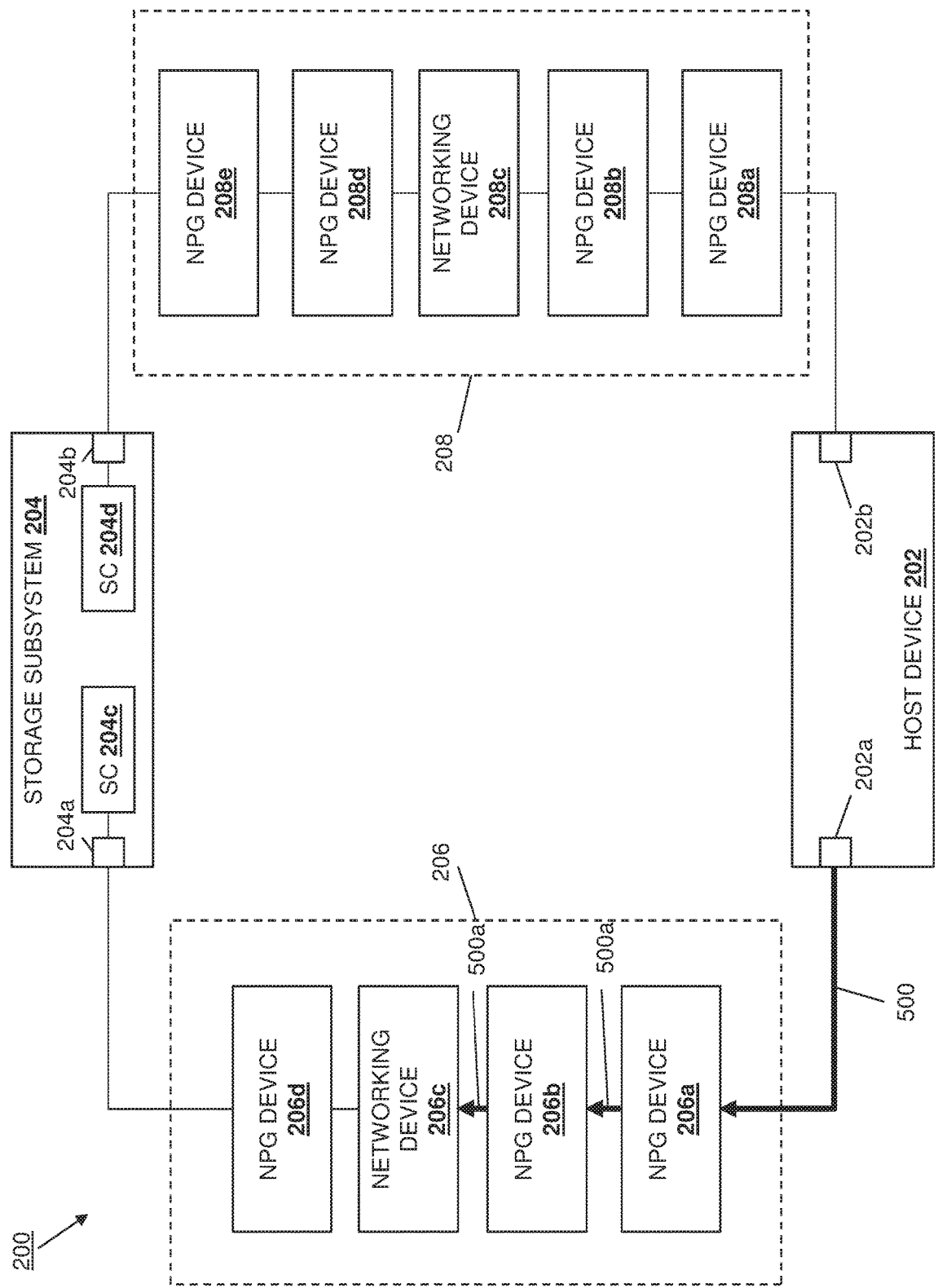
FIG. 5A is a schematic view illustrating an embodiment of the ALUA path selection system of FIG. 2 operating during the method of FIG. 4.

The method 400 begins at block 402 where networking devices receive host device communications generated by a host device. In an embodiment, at block 402, the host device 202 may generate communications for the networking device 206c and transmit those communications via the networking fabric 206 to the networking device 206c. With reference to FIG. 5A, the host device 202 is illustrated as transmitting a communication 500 via the networking fabric 206 to the networking device 206c, with that communication 500 transmitted via the port 202a on the host device 202 and received by the NPG device 206a, converted by the NPG device 206a to a communication 500a, augmented by the NPG device 206a with hop count/path cost information, and transmitted by the NPG device 206a to the NPG device 206b. Furthermore, as discussed below, that communication 500a may be received by the NPG device 206b, augmented by the NPG device 206b with hop count/path cost information, and transmitted by the NPG device 206b to the networking device 206c.

In a specific example, the communication 500 generated and transmitted by the host device 202 may be a Fabric LOGIn (FLOGI) communication, with the NPG device 206a converting that FLOGI communication to a Fabric DISCovery (FDISC) communication (i.e., the communication 500a) and transmitting the FDISC communication to the NPG device 206b. In an embodiment, the communication 500a (e.g., an FDISC communication) may be configured to store a hop count/path cost service parameter, and the NPG device 206a may be configured to increment a hop count/path cost counter that is provided by that hop count/path cost service parameter. For example, the NPG devices provided according to the teachings of the present disclosure may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a hop count/path cost incrementing engine that is configured to perform the functionality of the NPG devices described herein.

As such, with reference to the specific example illustrated in FIG. 5A, the hop count/path cost incrementing engine in the NPG device 206a may operate to increment the hop count/path cost counter that is provided by the hop count/path cost service parameter in the communication 500a (e.g., an FDISC communication) from 0 to 1 (i.e., the NPG device 206a may convert the communication 500 to the communication 500a that is provided with its hop count/path cost counter in its hop count/path cost service parameter at 0, and may then increment that hop count/path cost counter to 1 to indicate that the communication 500/500a generated by the host device 202 has performed one hop (via the NPG device 206a) subsequent to being transmitted by the host device 202.) Similarly, upon receiving the communication 500a from the NPG device 206a, the hop count/path cost incrementing engine in the NPG device 206b may operate to increment the hop count/path cost counter that is provided by the hop count/path cost service parameter in the communication 500a (e.g., an FDISC communication) from 1 to 2 (i.e., the NPG device 206b may increment the hop count/path cost counter in the hop count/path cost service parameter in the communication 500a to 2 to indicate that the communication 500/500a generated by the host device 202 has performed two hops (via the NPG device 206a and the NPG device 206b) subsequent to being transmitted by the host device 202.) While only two hops are illustrated as being performed between the host device 202 and the networking device 206c in the fabric 206 in this specific example, one of skill in the art in possession of the present disclosure will appreciate that any number of hops may be performed and counted between the host device and the networking device while remaining within the scope of the present disclosure as well. As such, at block 402 and as illustrated in FIG. 5A, the ALUA path selection engine 304 in the networking device 206c/300 may receive the communication 500a transmitted by the NPG device 206b via its communication system 308.

Figure 6A:
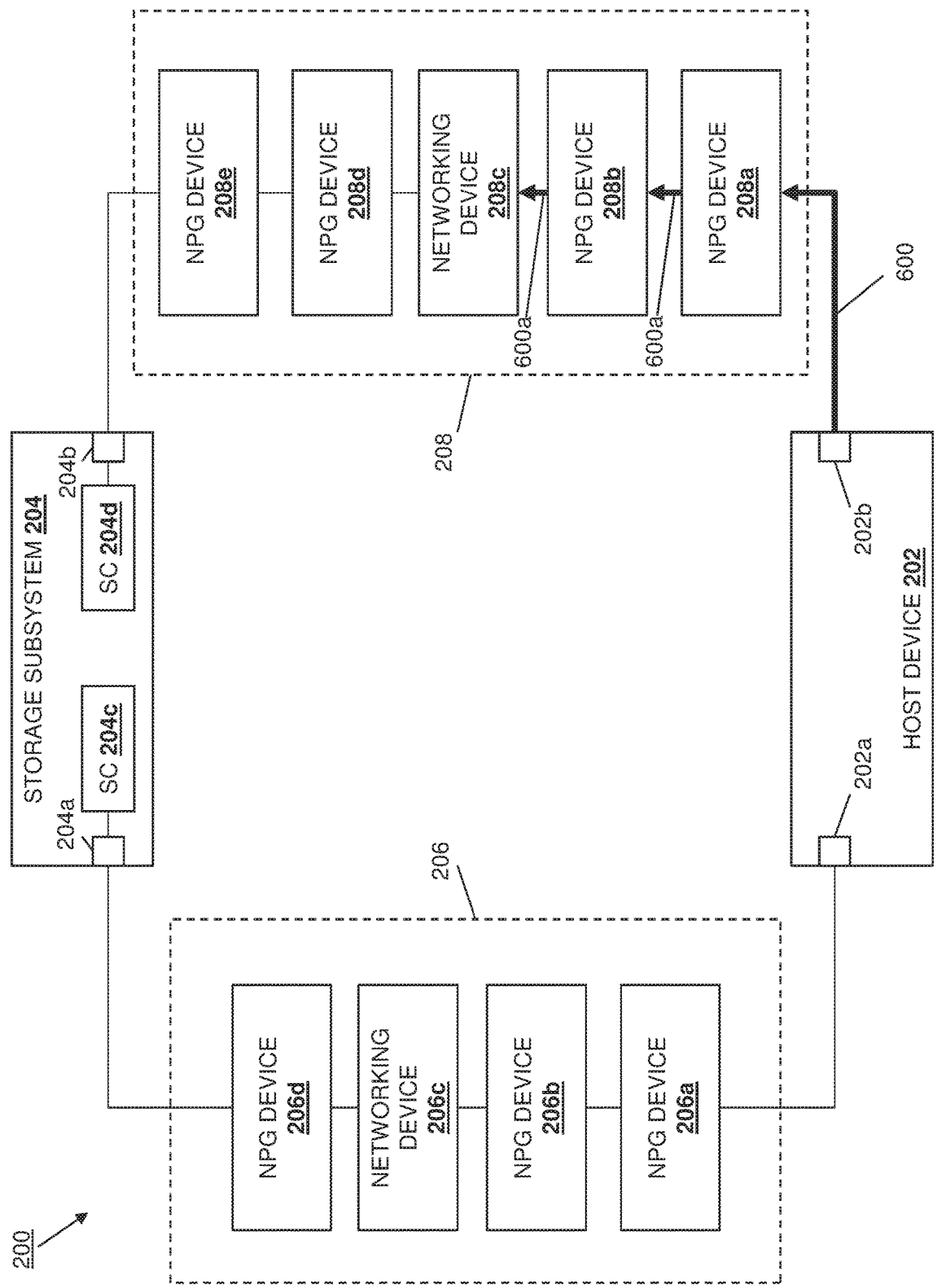
FIG. 6A is a schematic view illustrating an embodiment of the ALUA path selection system of FIG. 2 operating during the method of FIG. 4.

Similarly, with reference to FIG. 6A, in the examples below, the host device 202 is illustrated as transmitting a communication 600 to the networking device 208c via the networking fabric 208, with that communication 600 transmitted via the port 202b on the host device 202 and received by the NPG device 208a, converted by the NPG device 208a to a communication 600a, augmented by the NPG device 208a with hop count/path cost information, and transmitted by the NPG device 208a to the NPG device 208b. Furthermore, as discussed below, that communication 600a may be received by the NPG device 208b, augmented by the NPG device 208b with hop count/path cost information, and transmitted by the NPG device 208b to the networking device 208c.

Similarly as discussed above, the communication 600 generated and transmitted by the host device 202 may be a FLOGI communication, with the NPG device 208a converting that FLOGI communication to an FDISC communication (i.e., the communication 600a) and transmitting the FDISC communication to the NPG device 208b. In an embodiment, the communication 600a (e.g., an FDISC communication) may be configured to store a hop count/path cost service parameter, and the NPG device 208a may be configured to increment a hop count/path cost counter that is provided by that hop count/path cost service parameter using its hop count/path cost incrementing engine described above. As such, with reference to the specific example illustrated in FIG. 6A, the hop count/path cost incrementing engine in the NPG device 208a may operate to increment the hop count/path cost counter that is provided by the hop count/path cost service parameter in the communication 600a (e.g., an FDISC communication) from 0 to 1 (i.e., the NPG device 208a may convert the communication 600 to the communication 600a that is provided with its hop count/path cost counter in its hop count/path cost service parameter at 0, and may then increment that hop count/path cost counter to 1 to indicate that the communication 600/600a generated by the host device 202 has performed one hop (via the NPG device 208a) subsequent to being transmitted by the host device 202.)

Similarly as described above, upon receiving the communication 600a from the NPG device 208a, the hop count/path cost incrementing engine in the NPG device 208b may operate to increment the hop count/path cost counter that is provided by the hop count/path cost service parameter in the communication 600a (e.g., an FDISC communication) from 1 to 2 (i.e., the NPG device 208b may increment the hop count/path cost counter in the hop count/path cost service parameter in the communication 600a to 2 to indicate that the communication 600/600a generated by the host device 202 has performed two hops (via the NPG device 2068a and the NPG device 208b) subsequent to being transmitted by the host device 202.) While only two hops are illustrated as being performed between the host device 202 and the networking device 208c in the fabric 208 in this specific example, one of skill in the art in possession of the present disclosure will appreciate that any number of hops may be performed and counted between the host device and the networking device while remaining within the scope of the present disclosure as well. As such, at block 402 and as illustrated in FIG. 6A, the ALUA path selection engine 304 in the networking device 208c/300 may receive the communication 600a transmitted by the NPG device 208b via its communication system 308.

The method 400 then proceeds to block 404 where the networking devices retrieve respective host device hop counts/path costs from the host device communications. In an embodiment, at block 404 and in response to receiving the communication 500a at block 402, the ALUA path selection engine 304 in the networking device 206c/300 may operate to identify the value in the hop count/path cost counter in the hop count/path cost service parameter in the communication 500a, and store that value in its ALUA path selection database 306. Continuing with the specific example provided above, the networking device 206c/300 may be an FC switch device that includes F_port(s), and may operate at block 402 to identify the value (e.g., 2 hops in the example above) in the hop count/path cost counter in the hop count/path cost service parameter in the communication 500a (e.g., an FDISC communication), and store that value (along with any other name server details known in the art) in a name server database provided by the ALUA path selection database 306. However, while a specific example has been described, one of skill in the art in possession of the present disclosure will recognize that the hop count/path cost information of the present disclosure may be retrieved and stored by networking devices in a variety of manners that will fall within the scope of the present disclosure as well. Furthermore, one of skill in the art in possession of the present disclosure will recognize that the networking device 206c may perform a variety of conventional device login operations in response to receiving the communication 500a (e.g., a FLOGI communication converted to an FDISC communication in some of the examples provided above.)

Similarly as discussed above, at block 404 and in response to receiving the communication 600a at block 402, the ALUA path selection engine 304 in the networking device 208c/300 may operate to identify the value in the hop count/path cost counter in the hop count/path cost service parameter in the communication 600a, and store that value in its ALUA path selection database 306. Continuing with the specific example provided above, the networking device 208c/300 may be an FC switch device that includes F_port(s), and may operate at block 402 to identify the value (e.g., 2 hops in this example) in the hop count/path cost counter in the hop count/path cost service parameter in the communication 600a (e.g., an FDISC communication), and store that value (along with any other name server details known in the art) in a name server database provided by the ALUA path selection database 306. However, while a specific example has been described, one of skill in the art in possession of the present disclosure will recognize that the hop count/path cost information of the present disclosure may be retrieved and stored by networking devices in a variety of manners that will fall within the scope of the present disclosure as well. Furthermore, one of skill in the art in possession of the present disclosure will recognize that the networking device 208c may perform a variety of conventional device login operations in response to receiving the communication 600a (e.g., a FLOGI communication converted to an FDISC communication in some of the examples provided above.)

Figure 5B:
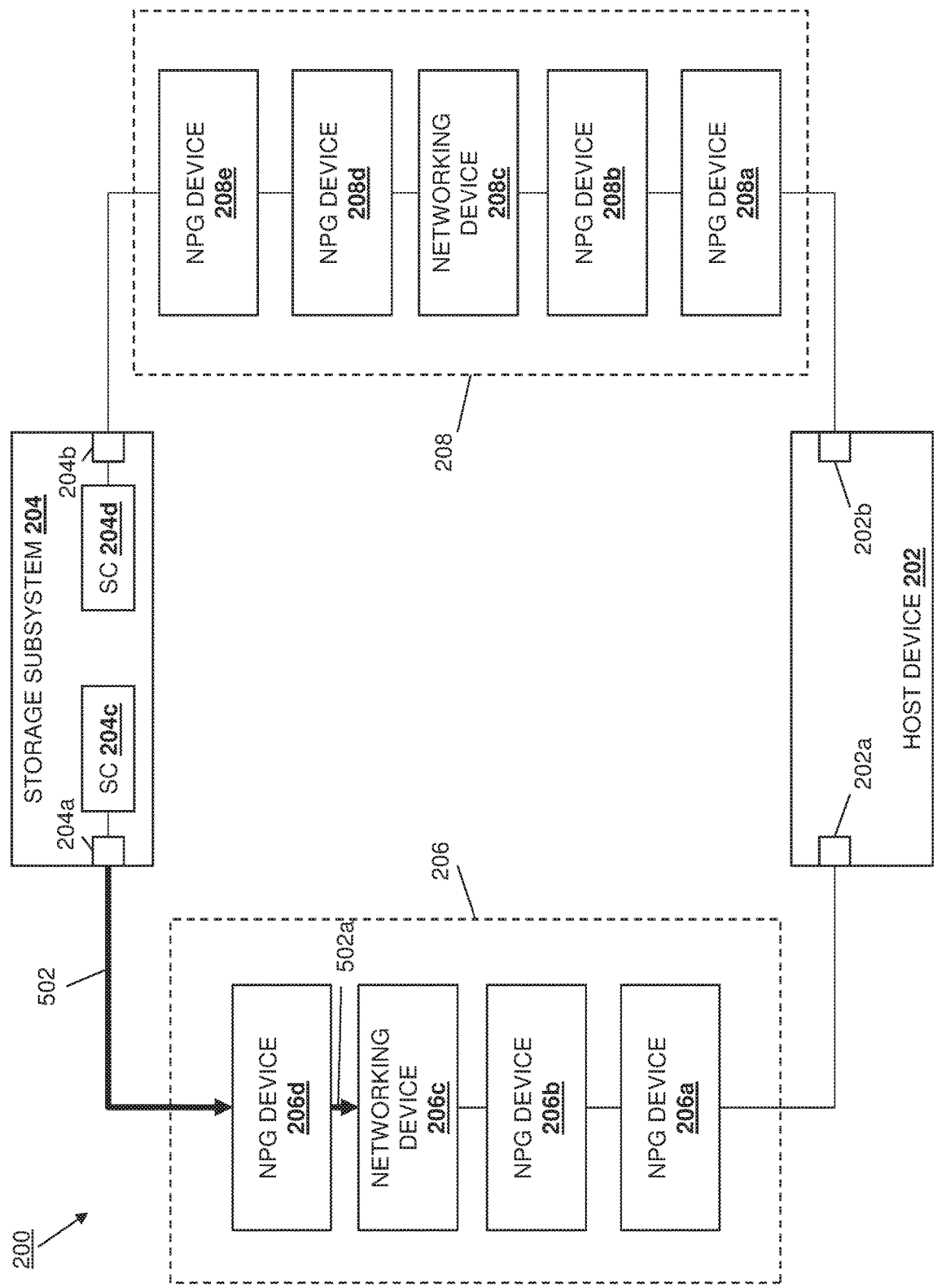
FIG. 5B is a schematic view illustrating an embodiment of the ALUA path selection system of FIG. 2 operating during the method of FIG. 4.

The method 400 then proceeds to block 406 where the networking devices receive storage subsystem communications generated by a storage subsystem. In an embodiment, at block 406, the storage subsystem 204 may generate communications for the networking device 206c and transmit those communications via the networking fabric 206 to the networking device 206c. With reference to FIG. 5B, the storage subsystem 204 is illustrated as transmitting a communication 502 to the networking device 206c via the networking fabric 206, with that communication 502 transmitted via the port 204a on the storage subsystem 204 and received by the NPG device 206d, converted by the NPG device 206d to a communication 502a, augmented by the NPG device 206d with hop count/path cost information, and transmitted by the NPG device 206d to the networking device 206c.

In a specific example, the communication 502 generated and transmitted by the storage subsystem 204 may be a Fabric LOGIn (FLOGI) communication, with the NPG device 206d converting that FLOGI communication to a Fabric DISCovery (FDISC) communication (i.e., the communication 502a) and transmitting the FDISC communication to the networking device 206c. In an embodiment, the communication 502a (e.g., an FDISC communication) may be configured to store a hop count/path cost service parameter, and the NPG device 206d may be configured to increment a hop count/path cost counter that is provided by that hop count/path cost service parameter. As discussed above, with reference to the specific example illustrated in FIG. 5B, the hop count/path cost incrementing engine in the NPG device 206d may operate to increment the hop count/path cost counter that is provided by the hop count/path cost service parameter in the communication 502a (e.g., an FDISC communication) from 0 to 1 (i.e., the NPG device 206d may convert the communication 502 to the communication 502a that is provided with its hop count/path cost counter in its hop count/path cost service parameter at 0, and may then increment that hop count/path cost counter to 1 to indicate that the communication 502/502a generated by the storage subsystem 204 has performed one hop (via the NPG device 206d) subsequent to being transmitted by the storage subsystem 204.) While only one hop is illustrated as being performed between the storage subsystem 204 and the networking device 206c in the networking fabric 206 in this specific example, one of skill in the art in possession of the present disclosure will appreciate that any number of hops may be performed and counted between the storage subsystem and the networking device while remaining within the scope of the present disclosure as well. As such, at block 406 and as illustrated in FIG. 5B, the ALUA path selection engine 304 in the networking device 206c/300 may receive the communication 502a transmitted by the NPG device 206d via its communication system 308.

Figure 6B:
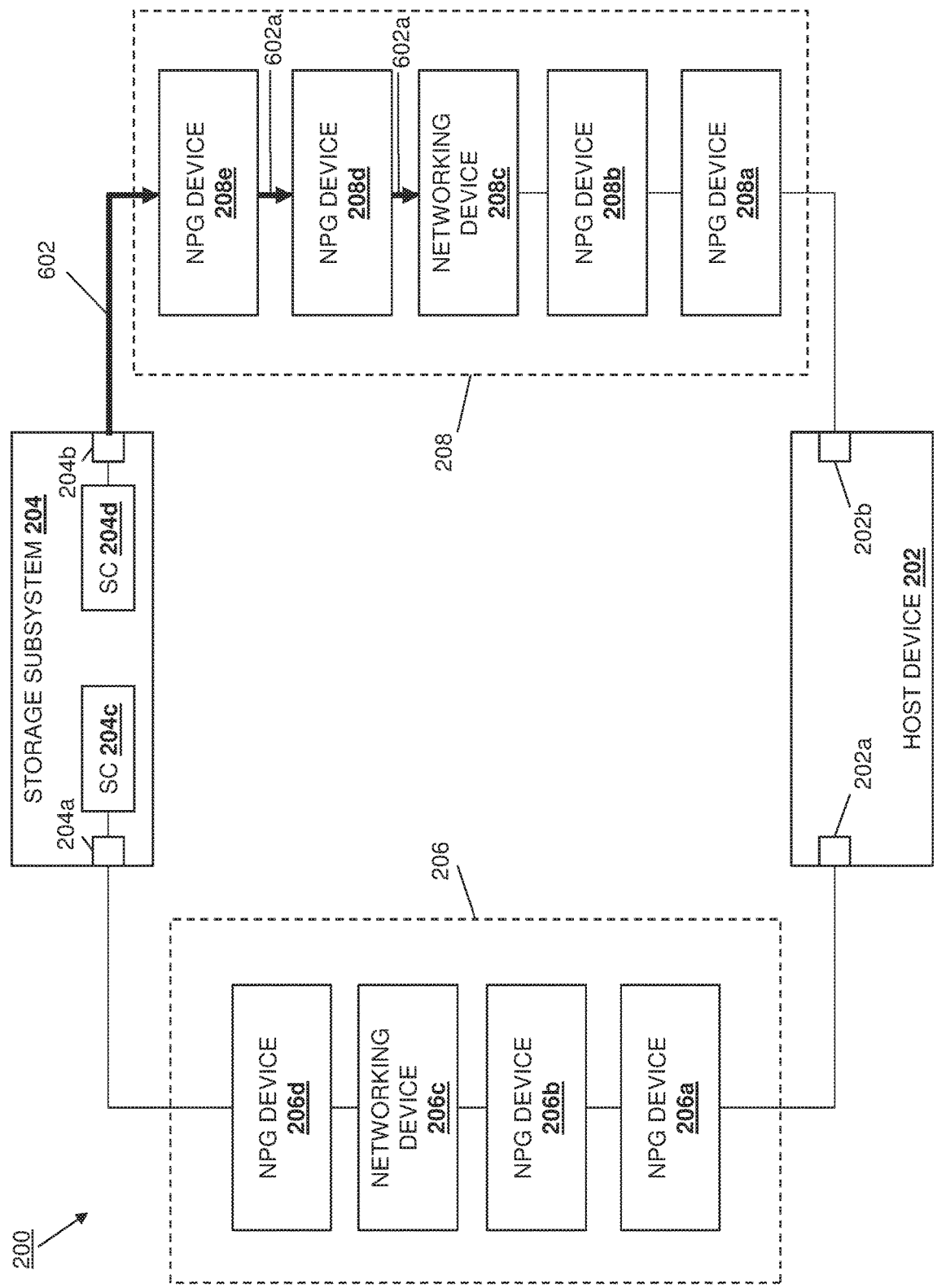
FIG. 6B is a schematic view illustrating an embodiment of the ALUA path selection system of FIG. 2 operating during the method of FIG. 4.

Similarly, with reference to FIG. 6B, the storage subsystem 204 is illustrated as transmitting a communication 602 to the networking device 208e via the networking fabric 208, with that communication 602 transmitted via the port 204b on the storage subsystem 204 and received by the NPG device 208e, converted by the NPG device 208e to a communication 602a, augmented by the NPG device 208e with hop count/path cost information, and transmitted by the NPG device 208e to the NPG device 208d. Furthermore, as discussed below, that communication 602a may be received by the NPG device 208d, augmented by the NPG device 208d with hop count/path cost information, and transmitted by the NPG device 208d to the networking device 208c.

Similarly as described above, the communication 602 generated and transmitted by the storage subsystem 204 may be a FLOGI communication, with the NPG device 208e converting that FLOGI communication to an FDISC communication (i.e., the communication 602a) and transmitting the FDISC communication to the NPG device 208d. In an embodiment, the communication 602a (e.g., an FDISC communication) may be configured to store a hop count/path cost service parameter, and the NPG device 208e may be configured to increment a hop count/path cost counter that is provided by that hop count/path cost service parameter using the hop count/path cost incrementing engine described above. As such, with reference to the specific example illustrated in FIG. 6B, the hop count/path cost incrementing engine in the NPG device 208e may operate to increment the hop count/path cost counter that is provided by the hop count/path cost service parameter in the communication 602a (e.g., an FDISC communication) from 0 to 1 (i.e., the NPG device 208e may convert the communication 602 to the communication 602a that is provided with its hop count/path cost counter in its hop count/path cost service parameter at 0, and may then increment that hop count/path cost counter to 1 to indicate that the communication 602/602a generated by the storage subsystem 204 has performed one hop (via the NPG device 208e) subsequent to being transmitted by the storage subsystem 204.)

Similarly as described above, upon receiving the communication 602a from the NPG device 208e, the hop count/path cost incrementing engine in the NPG device 208d may operate to increment the hop count/path cost counter that is provided by the hop count/path cost service parameter in the communication 602a (e.g., an FDISC communication) from 1 to 2 (i.e., the NPG device 208d may increment the hop count/path cost counter in the hop count/path cost service parameter in the communication 602a to 2 to indicate that the communication 602/602a generated by the storage subsystem 204 has performed two hops (via the NPG device 208e and the NPG device 208d) subsequent to being transmitted by the storage subsystem 204.) While only two hops are illustrated as being performed between the storage subsystem 204 and the networking device 208c in the fabric 208 in this specific example, one of skill in the art in possession of the present disclosure will appreciate that any number of hops may be performed and counted between the storage subsystem and the networking device while remaining within the scope of the present disclosure as well. As such, at block 408 and as illustrated in FIG. 6B, the ALUA path selection engine 304 in the networking device 208c/300 may receive the communication 602a transmitted by the NPG device 208d via its communication system 308.

The method 400 then proceeds to block 408 where the networking devices retrieve respective storage subsystem hop counts/path costs from the storage subsystem communications. In an embodiment, at block 408 and in response to receiving the communication 502a at block 406, the ALUA path selection engine 304 in the networking device 206c/300 may operate to identify the value of the hop count/path cost counter in the hop count/path cost service parameter in the communication 502a, and store that value in its ALUA path selection database 306. Continuing with the specific example provided above, the networking device 206c/300 may be an FC switch device that includes F_port(s), and may operate at block 406 to identify the value (e.g., 1 hop in this example) of the hop count/path cost counter in the hop count/path cost service parameter in the communication 502a (e.g., an FDISC communication), and store that value (along with any other name server details known in the art) in a name server database provided by the ALUA path selection database 306. However, while a specific example has been described, one of skill in the art in possession of the present disclosure will recognize that the hop count/path cost information of the present disclosure may be retrieved and stored by networking devices in a variety of manners that will fall within the scope of the present disclosure as well. Furthermore, one of skill in the art in possession of the present disclosure will recognize that the networking device 206c may perform a variety of conventional device login operations in response to receiving the communication 502a (e.g., a FLOGI communication converted to an FDISC communication in some of the examples provided above.)

Similarly as discussed above, at block 404 and in response to receiving the communication 602a at block 408, the ALUA path selection engine 304 in the networking device 208c/300 may operate to identify the value in the hop count/path cost counter in the hop count/path cost service parameter in the communication 602a, and store that value in its ALUA path selection database 306. Continuing with the specific example provided above, the networking device 208c/300 may be an FC switch device that includes F_port(s), and may operate at block 408 to identify the value (e.g., 2 hops in this example) in the hop count/path cost counter in the hop count/path cost service parameter in the communication 602a (e.g., an FDISC communication), and store that value (along with any other name server details known in the art) in a name server database provided by the ALUA path selection database 306. However, while a specific example has been described, one of skill in the art in possession of the present disclosure will recognize that the hop count/path cost information of the present disclosure may be retrieved and stored by networking devices in a variety of manners that will fall within the scope of the present disclosure as well. Furthermore, one of skill in the art in possession of the present disclosure will recognize that the networking device 208c may perform a variety of conventional device login operations in response to receiving the communication 602a (e.g., a FLOGI communication converted to an FDISC communication in some of the examples provided above.)

In other, non-illustrated embodiments, devices may be connected via Expansion Ports (E_ports) that provide a link between networking devices (e.g., an Inter-Switch Link (ISL) provided by inter-switch ports on FC switch devices), and those networking devices may maintain domain reachability cost information associated with reaching the devices connected via the E_ports. In such embodiments, the hop count/path cost information discussed above may be added to the domain reachability cost information, and the combination may be stored in the name server database, and provided to the host device 202 in substantially the same manner as described below.

Figure 7A:
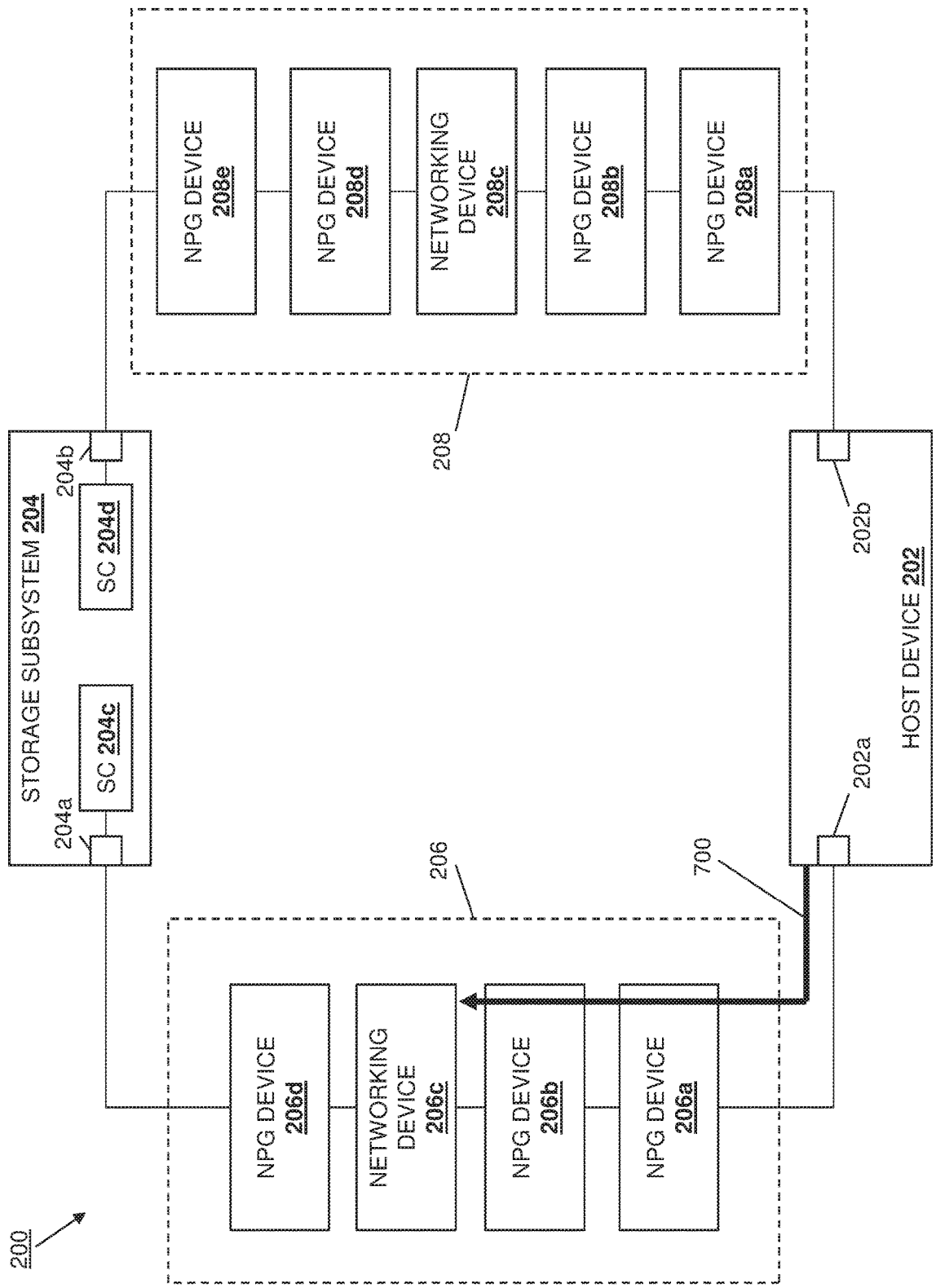
FIG. 7A is a schematic view illustrating an embodiment of the ALUA path selection system of FIG. 2 operating during the method of FIG. 4.

The method 400 then proceeds to block 410 where the networking devices receive hop count/path cost requests from the host device. In an embodiment, at block 410, the host device 202 may generate and transmit hop count/path cost requests to each of the networking devices 206c and 206d. For example, with reference to FIG. 7A, the host device 202 is illustrated as transmitting a hop count/path cost request 700 to the networking device 206c via the fabric 206. In an embodiment, the hop count/path cost request 700 may be included in name server request communications transmitting by the host device 202 to the networking device 206c, although one of skill in the art in possession of the present disclosure will recognize that other techniques may be utilized for requesting hop count/path cost information from the networking device 206c while remaining within the scope of the present disclosure as well. In one specific example, the hop count/path cost request 700 may include a "Get Hop Count/Cost-Port Identifier" (GHC_ID) communication that utilizes a request object in a Common Transport Information Unit (CT_IU) to identify the port 202a on the host device 202 to the networking device 206c. In another specific example, the hop count request 700 may include a "Get Path Count/Cost-Port Identifier" (GPC_ID) communication that utilizes a request object in a CT_IU to identify the port 202a on the host device 202 to the networking device 206c. As such, at block 410, the ALUA path selection engine 304 in the networking devices 206c/300 may receive the hop count/path cost request 700 via its communication system 308.

Figure 7B:
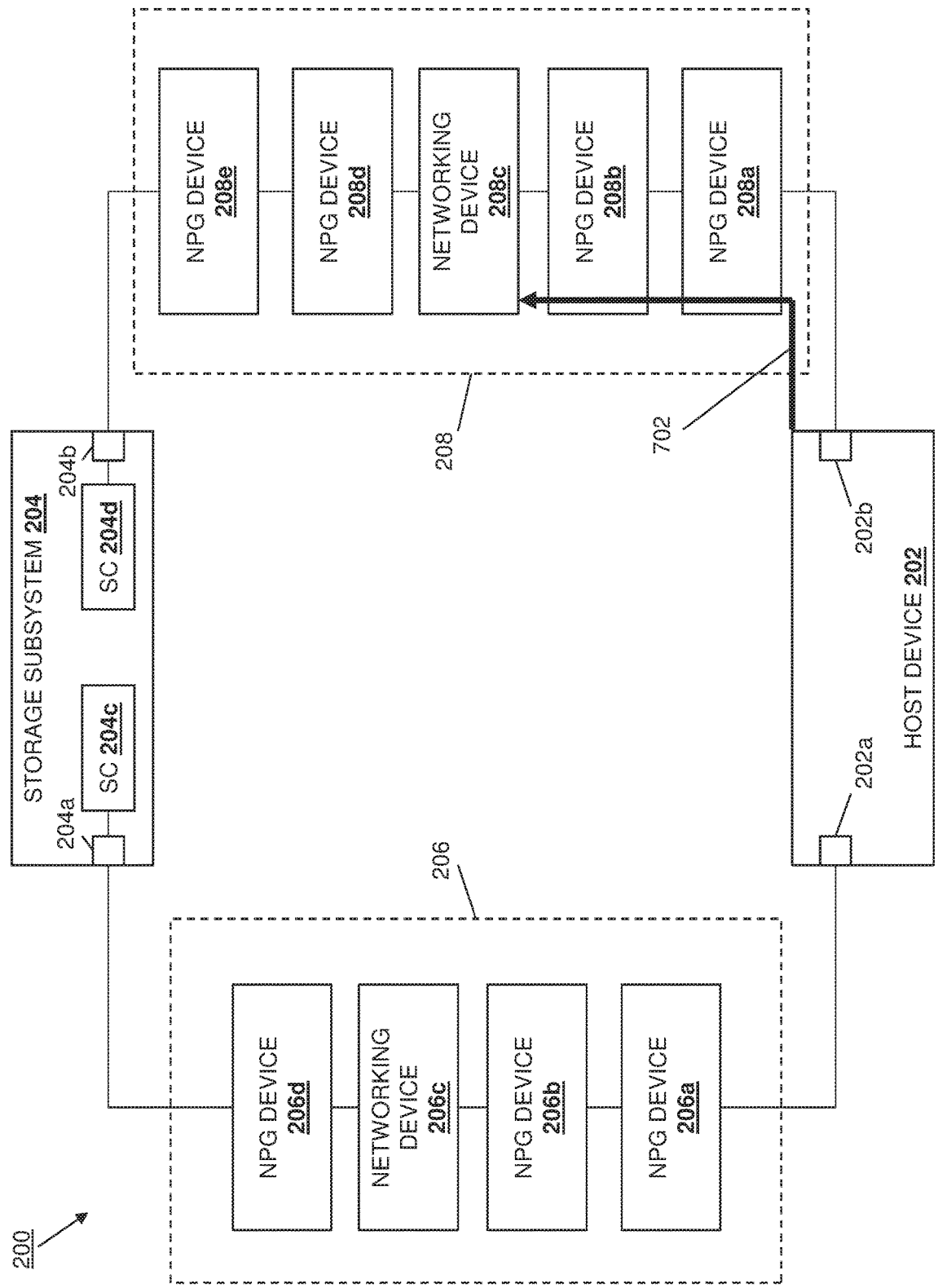
FIG. 7B is a schematic view illustrating an embodiment of the ALUA path selection system of FIG. 2 operating during the method of FIG. 4.

Similarly, with reference to FIG. 7B, the host device 202 is illustrated as transmitting a hop count/path cost request 702 to the networking device 208c via the fabric 208. In an embodiment, the hop count/path cost request 702 may be included in name server request communications transmitting by the host device 202 to the networking device 208c, although one of skill in the art in possession of the present disclosure will recognize that other techniques may be utilized for requesting hop count/path cost information from the networking device 208c while remaining within the scope of the present disclosure as well. In one specific example, the hop count/path cost request 702 may include a GHC_ID communication that utilizes a request object in a CT_IU to identify the port 202b on the host device 202 to the networking device 208c. In another specific example, the hop count request 702 may include a GPC_ID communication that utilizes a request object in a CT_IU to identify the port 202a on the host device 202 to the networking device 208c, As such, at block 410, the ALUA path selection engine 304 in the networking devices 208c/300 may receive the hop count/path cost request 702 via its communication system 308.

Figure 8A:
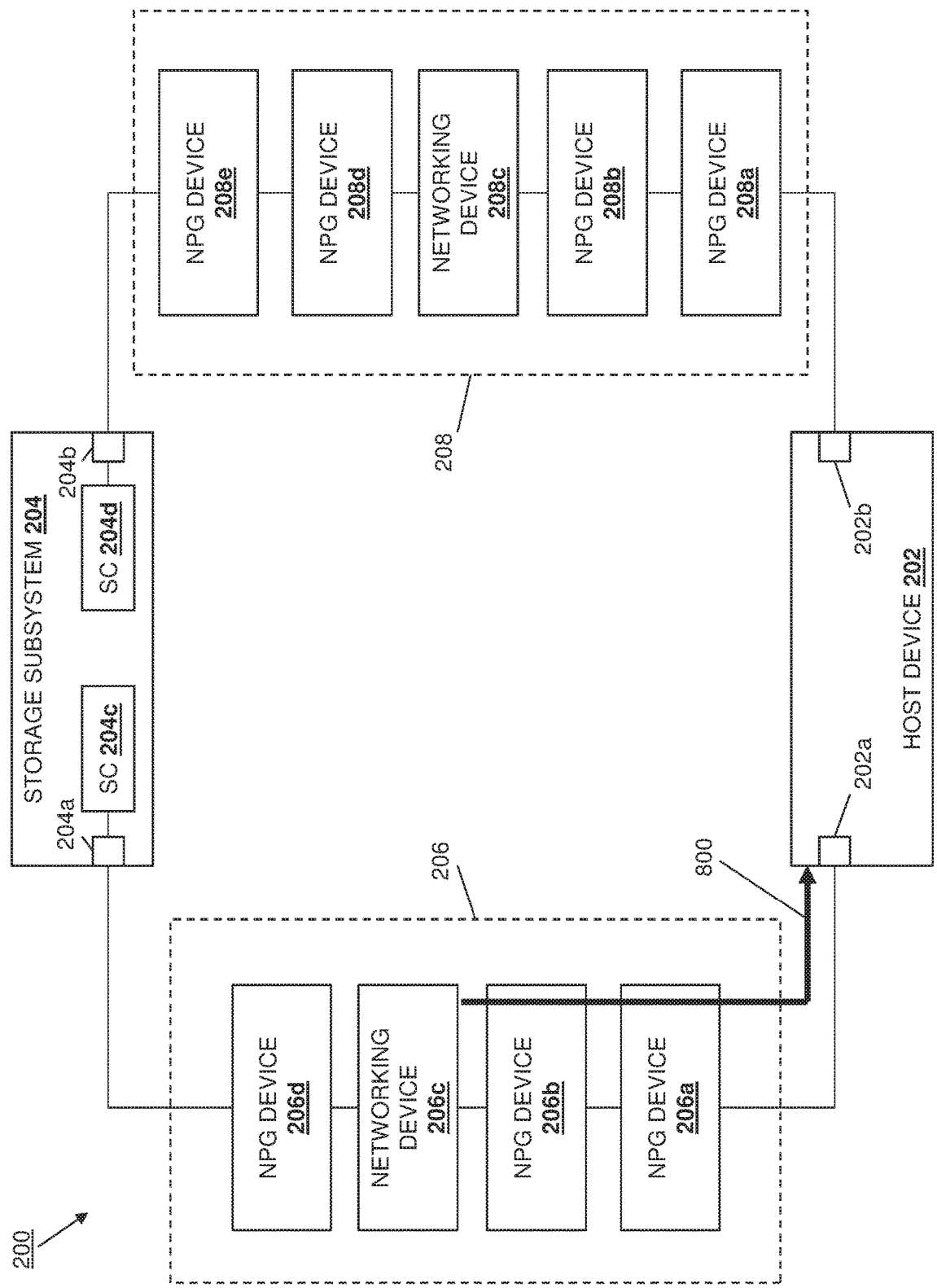
FIG. 8A is a schematic view illustrating an embodiment of the ALUA path selection system of FIG. 2 operating during the method of FIG. 4.
Figure 8B:
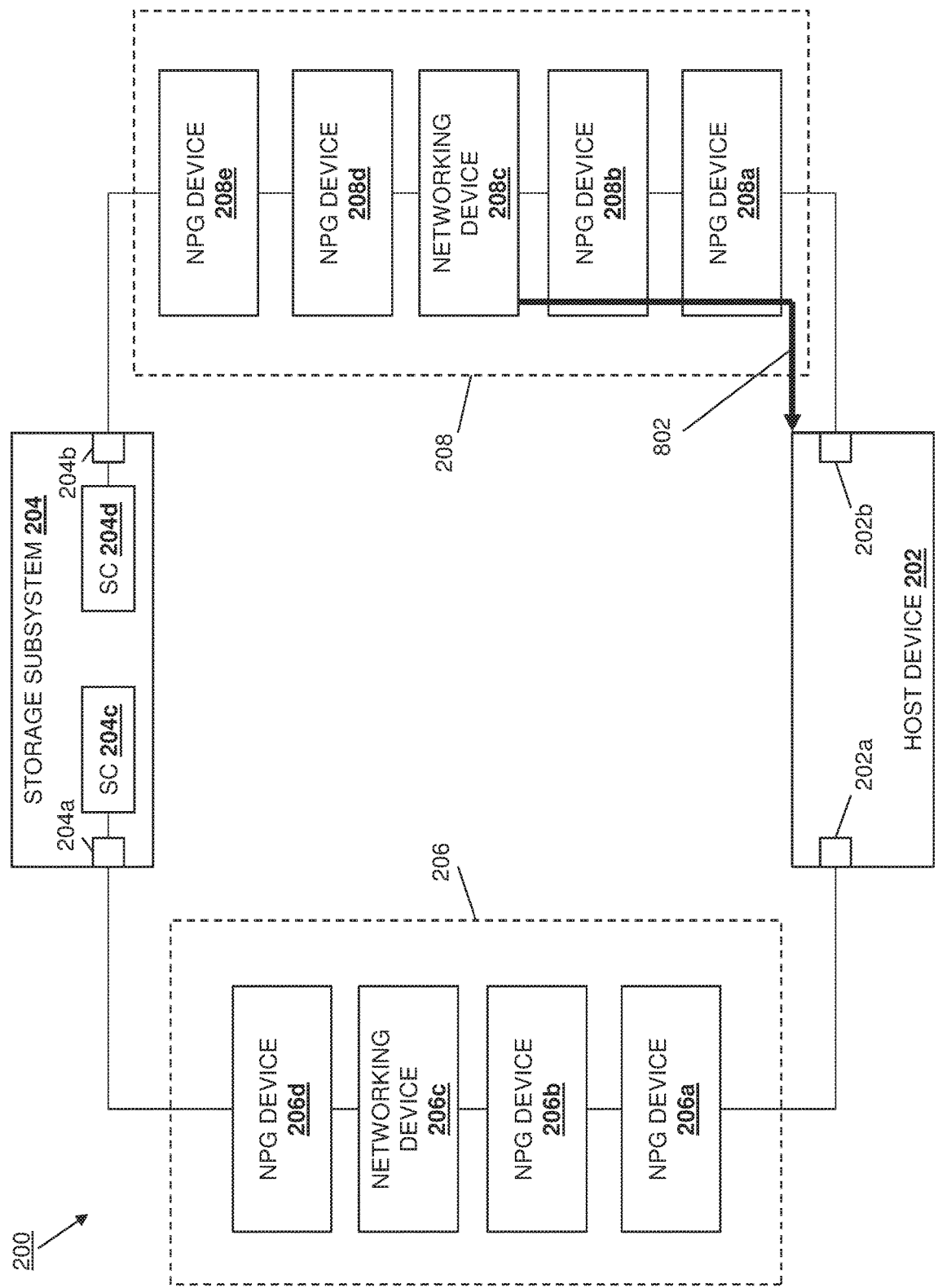
FIG. 8B is a schematic view illustrating an embodiment of the ALUA path selection system of FIG. 2 operating during the method of FIG. 4.

The method 400 then proceeds to block 412 where the networking devices transmit the respective host device hop counts and/or storage subsystem hop counts to the host device. In an embodiment, at block 412, the ALUA path selection engine 304 in the networking devices 206c/300 and 208c/300 may generate and transmit hop count/path cost responses via its communication system 308 to each of the networking devices 206c and 206d, respectively. For example, with reference to FIG. 8A, the networking device 206c is illustrated as transmitting a hop count/path cost response 800 to the host device 202 via the fabric 206 and the port 202a. In an embodiment, the hop count/path cost response 800 may be included in name server response communications transmitting by the networking device 206c to the host device 202, although one of skill in the art in possession of the present disclosure will recognize that other techniques may be utilized for responding with hop count/path cost information to the host device 202 while remaining within the scope of the present disclosure as well. In one specific example, the hop count/path cost response 800 may include a GHC_ID response communication that utilizes a response object in a CT_IU to identify a number of hops to reach the host device 202 from the networking device 206c (e.g., a number of hops between an F_Port on an FC switch device that provides the networking device 206c and the port 202a on the host device 202, which is the two hops identified in the communication 500a in the example discussed above.) In another specific example, the hop count/path cost response 800 may include a GPC_ID response communication that utilizes a response object in a CT_IU to identify a number of hops between the storage subsystem 204 and the host device 202 (e.g., a number of hops between the port 204a on the storage system 204 and the port 202a on the host device 202, which is three hops: the two hops identified in the communication 500a, plus the one hop identified in the communication 600a in the example discussed above.) As such, at block 412, the host device 202 may receive the hop count response 800 from the networking device 206c.

Similarly, with reference to FIG. 7B, the networking device is illustrated as transmitting a hop count/path cost response 802 to the host device 202 via the fabric 208. In an embodiment, the hop count/path cost response 802 may be included in name server response communications transmitting by the networking device 208c to the host device 202, although one of skill in the art in possession of the present disclosure will recognize that other techniques may be utilized for responding with hop count/path cost information to the host device 202 while remaining within the scope of the present disclosure as well. In one specific example, the hop count/path cost response 802 may include a GHC_ID response communication that utilizes a response object in a CT_IU to identify a number of hops to reach the host device 202 from the networking device 208c (e.g., a number of hops between an F_Port on an FC switch device that provides the networking device 208c and the port 202b on the host device 202, which is the two hops identified in the communication 600a in the example discussed above.) In another specific example, the hop count/path cost response 802 may include a GPC_ID response communication that utilizes a response object in a CT_IU to identify a number of hops between the storage subsystem 204 and the host device 202 (e.g., a number of hops between the port 204b on the storage system 204 and the port 202b on the host device 202, which is four hops: the two hops identified in the communication 600a, plus the two hops identified in the communication 602a in the example discussed above.) As such, at block 412, the host device 202 may receive the hop count response 802 from the networking device 206c.

The method 400 then proceeds to block 414 where the host device uses the respective host device hop counts/path costs and/or storage subsystem hop counts/path costs to select an active-optimized path to a LUN in the storage subsystem. In an embodiment, at block 414, the host device 202 may utilize the hop count/path cost responses received from the networking devices 206c and 208c in order to select an active-optimized path to the storage subsystem 204 via one of the fabrics 206 or 208. For example, the storage system 204 may provide a LUN, and the ownership of that LUN must be assigned to one of the storage controllers 204c or 204d in the storage subsystem 204. In making that assignment determination, the host device 202 may review the hop counts identified in the hop count/path cost responses received from the networking devices in the different fabrics to determine which of the storage controllers should own that LUN, which will result in one of the paths through one of the fabrics being designated an active-optimized path, and the other of the paths through the other of the fabrics being designated as an active-non-optimized path. Continuing with the example discussed above, at block 414, the host device 202 may utilize the hop count/path cost responses 800 and 802 to determine that the fabric 206 provides two hops between the host device 202 and the networking device 206c, and three hops between the host device 202 and the storage subsystem 204. Similarly, at block 414, the host device 202 may utilize the hop count/path cost responses 800 and 802 to determine that the fabric 208 provides two hops between the host device 202 and the networking device 208c, and four hops between the host device 202 and the storage subsystem 204.

As such, at block 414, the host device 202 may utilize the hop count responses to determine that the active-optimized path between the host device 202 and the storage subsystem 204 should be provided by the networking device 206c in the fabric 206, while the active-non-optimized path between the host device 202 and the storage subsystem 204 should be provided by the networking device 208c in the fabric 208 (i.e., so that the active-optimized path requires fewer hops (which requires 3 hops in the examples above) than the active-non-optimized path (which requires 4 hops in the examples above). In response to identifying the active-optimized path through the fabric 206 and active-non-optimized path through the fabric 208, the host device 202 may communicate with the storage system 204 to provide the storage controller 204c ownership of the LUN, which one of skill in the art in possession of the present disclosure will recognize will result in the active-optimized path being provided by the networking device 206c in the fabric 206, and the active-non-optimized path being provided by the networking device 208c in the fabric 208.

As will be appreciated by one of skill in the art in possession of the present disclosure, in different embodiments, the host device 202 may utilize any of the respective hop counts between itself and each of the networking devices 206c and 208c, the respective hop counts between each of the networking devices 206c and 208c and the storage subsystem 204, and/or the respective sums of (1) the hop counts between itself and each of the networking devices 206c and 208c and (2) the hop counts between each of the networking devices 206c and 208c and the storage subsystem 204, in order to identify the active-optimized path. For example, in some embodiments, the GPO_IU's that provide the number of hops between the host device 202 and each the networking devices 206c and 206c may be utilized by the host device to determine whether the active-optimized path should be provided by the networking device 206c or the networking device 208c.

Thus, systems and methods have been described that provide for the identification of hop counts/path costs between end devices via different paths that include different FC switch devices, and the provisioning of those hop counts/path costs to server devices for use in selecting an active-optimized path in an ALUA system with the lowest hop count/path cost. For example, different FC switch devices may receive server device communications generated by a server device, and may each retrieve a server device hop count/path cost from those server device communications that identifies the number of hops between the server device and that FC switch device. Those FC switch devices may also receive storage subsystem communications generated by a storage subsystem, and may each retrieve storage subsystem hop counts/path costs from those storage subsystem communications that identify a number of hops between the storage subsystem and that FC switch device. When the FC switch devices receive hop count/path cost requests from the server device, they may each transmit at least one of their retrieved server device hop count/path costs and storage subsystem hop count/path cost to the server device, and the server device may use the server device hop counts/path costs and/or the storage subsystem hop counts/path costs received from the different FC switch devices to select an active-optimized path to a Logical Unit Number (LUN) included in the storage subsystem that has the fewest number of hops. As such, more efficient active-optimized paths between server devices and storage subsystems may be selected and utilized in ALUA systems.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An Asymmetric Logical Unit Access (ALUA) path selection system, comprising:
    a host device;
    a storage subsystem; and
    a first networking device that is included in a first networking fabric and that couples the host device to the storage device, wherein the first networking device is configured to:
        receive a first host device communication generated by the host device;
        retrieve, from the first host device communication, a first host device hop count that identifies a number of hops between the host device and the first networking device;
        receive a first storage subsystem communication generated by the storage subsystem;
        retrieve, from the first storage subsystem communication, a first storage subsystem hop count that identifies a number of hops between the storage subsystem and the first networking device;
        receive, from the host device, a first hop count request; and
        transmit, in response to the first hop count request, at least one of the first host device hop count and the first storage subsystem hop count, wherein the host device is configured to use the at least one of the first host device hop count and the first storage subsystem hop count to select an active-optimized path to a Logical Unit Number (LUN) included in the storage subsystem.

2. The system of claim 1, further comprising:
    a second networking device that is included in a second networking fabric and that couples the host device to the storage device, wherein the second networking device is configured to:
        receive a second host device communication generated by the host device;
        retrieve, from the second host device communication, a second host device hop count that identifies a number of hops between the host device and the second networking device;
        receive a second storage subsystem communication generated by the storage subsystem;
        retrieve, from the second storage subsystem communication, a second storage subsystem hop count that identifies a number of hops between the storage subsystem and the second networking device;
        receive, from the host device, a second hop count request; and
        transmit, in response to the second hop count request, at least one of the second host device hop count and the second storage subsystem hop count, wherein the host device is configured to use the at least one of the second host device hop count and the second storage subsystem hop count to select the active-optimized path to the LUN included in the storage subsystem.

3. The system of claim 1, further comprising:
at least one first fabric proxy gateway device that is included in the first networking fabric and that couples the host device to the first networking device, wherein each at least one first fabric proxy gateway device is configured to:
receive the first host device communication that was generated by the host device;
increment a hop counter in the first host device communication; and
transmit the first host device communication to the first networking device, wherein the first networking device is configured to retrieve the first host device hop count from the hop counter in the first host device communication.

4. The system of claim 1, further comprising:
at least one first fabric proxy gateway device that is included in the first networking fabric and that couples the storage subsystem to the first networking device, wherein each at least one first fabric proxy gateway device is configured to:
receive the first storage subsystem communication that was generated by the storage subsystem;
increment a hop counter in the first storage subsystem communication; and
transmit the first storage subsystem communication to the first networking device, wherein the first networking device is configured to retrieve the first storage subsystem hop count from the hop counter in the first storage subsystem communication.

5. The system of claim 1, wherein the first host device communication is associated with a host device login communication generated and transmitted by the host device, and wherein the first storage subsystem communication is associated with a storage subsystem login communication generated and transmitted by the storage subsystem.

6. The system of claim 1, wherein the first networking device is configured to:
store each of the first host device hop count and the first storage subsystem hop count in a name server database; and
retrieve the at least one of the first host device hop count and the first storage subsystem hop count for transmittal to the host device.

7. The system of claim 1, wherein the host device is configured to use the at least one of the first host device hop count and the first storage subsystem hop count to determine that the first networking device provides a path to the storage subsystem with a lowest available hop count and, in response, select the path provided by the first networking device as the active-optimized path to the LUN included in the storage subsystem.

8. An Information Handling System (IHS); comprising:
a processing system; and
a memory system that is coupled to the processing system and that includes instructions that, when executed by the processing system, cause the processing system to provide a path selection engine that is configured to:
receive a host device communication generated by a host device;
retrieve, from the host device communication, a host device hop count that identifies a number of hops between the host device and the processing system;
receive a storage subsystem communication generated by a storage subsystem;
retrieve, from the storage subsystem communication, a storage subsystem hop count that identifies a number of hops between the storage subsystem and the processing system;
receive, from the host device, a hop count request; and
transmit, in response to the hop count request, at least one of the host device hop count and the storage subsystem hop count, wherein the at least one of the host device hop count and the storage subsystem hop count are configured for use by the host device to select an active-optimized path to a Logical Unit Number (LUN) included in the storage subsystem.

9. The IHS of claim 8, wherein the path selection engine that is configured to: retrieve the host device hop count from a hop counter in the host device communication that was incremented by at least one proxy gateway device that couples the host device to the processing system.

10. The IHS of claim 8, wherein the path selection engine that k configured to: retrieve the storage subsystem hop count from a hop counter in the storage subsystem communication that was incremented by at least one proxy gateway device that couples the storage subsystem to the processing system.

11. The IHS of claim 8, wherein the host device communication is associated with a host device login communication generated and transmitted by the host device, and wherein the storage subsystem communication is associated with a storage subsystem login communication generated and transmitted by the storage subsystem.

12. The IHS of claim 8, wherein the path selection engine that is configured to: store each of the host device hop count and the storage subsystem hop count in a name server database; and retrieve the at least one of the host device hop count and the storage subsystem hop count for transmittal to the host device.

13. IHS of claim 8, wherein the at least one of the host device hop count and the storage subsystem hop count are configured for use by the host device to determine that the processing system provides a path to the storage subsystem with a lowest available hop count and, in response, select the path provided by the processing system as the active-optimized path to the LUN included in the storage subsystem.

14. A method for path selection in an Asymmetric Logical Unit Access (ALUA) system, comprising:
receiving, by a first networking device, a first host device communication generated by a host device;
retrieving, by the first networking device from the first host device communication, a first host device hop count that identifies a number of hops between the host device and the first networking device;
receiving, by the first networking device, a first storage subsystem communication generated by a storage subsystem;
retrieving, by the first networking device from the first storage subsystem communication, a first storage subsystem hop count that identifies a number of hops between the storage subsystem and the first networking device;
receiving, by the first networking device from the host device, a first hop count request; and
transmitting, by the first networking device in response to the first hop count request, at least one of the first host device hop count and the first storage subsystem hop count, wherein the at least one of the first host device hop count and the first storage subsystem hop count are configured for use by the host device to select an active-optimized path to a Logical Unit Number (LUN) included in the storage subsystem.

15. The method of claim 14, further comprising:
receiving, by a second networking device, a second host device communication generated by the host device;
retrieving, by the second networking device from the second host device communication, a second host device hop count that identifies a number of hops between the host device and the second networking device;
receiving, by the second networking device, a second storage subsystem communication generated by the storage subsystem;
retrieving, by the second networking device from the second storage subsystem communication, a second storage subsystem hop count that identifies a number of hops between the storage subsystem and the second networking device;
receiving, by the second networking device from the host device, a second hop count request; and
transmitting, by the second networking device in response to the second hop count request, at least one of the second host device hop count and the second storage subsystem hop count, wherein the at least one of the second host device hop count and the second storage subsystem hop count are configured for use by the host device to select the active-optimized path to the LUN included in the storage subsystem.

16. The method of claim 14, further comprising:
receiving, by at least one first fabric proxy gateway device that couples the host device to the first networking device, the first host device communication that was generated by the host device;
incrementing, by each at least one first fabric proxy gateway device, a hop counter in the first host device communication; and
transmitting, by each at least one first fabric proxy gateway device, the first host device communication to the first networking device, wherein the first networking device is configured to retrieve the first host device hop count from the hop counter in the first host device communication.

17. The method of claim 14, further comprising:
receiving, by at least one first fabric proxy gateway device that couples the storage subsystem to the first networking device, the first storage subsystem communication that was generated by the storage subsystem;
incrementing, by each at least one first fabric proxy gateway device, a hop counter in the first storage subsystem communication; and
transmitting, by each at least one first fabric proxy gateway device, the first storage subsystem communication to the first networking device, wherein the first networking device is configured to retrieve the first storage subsystem hop count from the hop counter in the first storage subsystem communication.

18. The method of claim 14, wherein the first host device communication is associated with a host device login communication generated and transmitted by the host device, and wherein the first storage subsystem communication is associated with a storage subsystem login communication generated and transmitted by the storage subsystem.

19. The method of claim 14, further comprising:
storing, by the first networking device, each of the first host device hop count and the first storage subsystem hop count in a name server database; and
retrieving, by the first networking device, the at feast one of the first host device hop count and the first storage subsystem hop count for transmittal to the host device.

20. The method of claim 14, further comprising:
wherein the at least one of the first host device hop count and the first storage subsystem hop count are configured for use by host device to determine that the first networking device provides a path to the storage subsystem with a lowest available hop count and, in response, select the path provided by the first networking device as the active-optimized path to the LUN included in the storage subsystem.

* * * * *

UNITED STATES PATENT AND TRADEMARK OFFICE
CERTIFICATE OF CORRECTION

PATENT NO. : 11,096,108 B2
APPLICATION NO. : 16/667490
DATED : August 17, 2021
INVENTOR(S) : Subbiah et al.

Page 1 of 1

It is certified that error appears in the above-identified patent and that said Letters Patent is hereby corrected as shown below:

In the Claims

Claim 8, Column 17, Line 55, "(IHS);" should be changed to --(IHS),--;

Claim 10, Column 18, Line 19, "k" should be changed to --is--;

Claim 13, Column 18, Line 36, "IHS" should be changed to --The IHS--;

Claim 19, Column 20, Line 28, "at feast" should to changed to --at least--.

Signed and Sealed this
First Day of March, 2022

Drew Hirshfeld
*Performing the Functions and Duties of the
Under Secretary of Commerce for Intellectual Property and
Director of the United States Patent and Trademark Office*